(12) United States Patent
Baydoun et al.

(10) Patent No.: US 11,990,306 B2
(45) Date of Patent: May 21, 2024

(54) ELECTRIFIED VEHICLE TRACTION POWERTRAIN MODULE HAVING REMOVABLY INSERTABLE FUSE BOX

(71) Applicant: Ford Global Technologies, LLC, Dearborn, MI (US)

(72) Inventors: Mohammed Michael Baydoun, Dearborn Heights, MI (US); Senate Ghanim, Dearborn, MI (US); Darko Acevski, Sterling Heights, MI (US); Douglas G. Hughes, Highland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 80 days.

(21) Appl. No.: 17/883,672

(22) Filed: Aug. 9, 2022

(65) Prior Publication Data

US 2024/0055212 A1    Feb. 15, 2024

(51) Int. Cl.
*H01H 85/20*    (2006.01)
*B60R 16/023*    (2006.01)

(52) U.S. Cl.
CPC ......... *H01H 85/20* (2013.01); *B60R 16/0238* (2013.01); *H01H 2085/208* (2013.01)

(58) Field of Classification Search
CPC ............. H01H 85/20; H01H 2085/208; B60R 16/0238
See application file for complete search history.

(56) References Cited

U.S. PATENT DOCUMENTS

| | | | |
|---|---|---|---|
| 7,919,203 B2 | 4/2011 | Shibuya et al. | |
| 11,508,543 B2* | 11/2022 | Kwon | H01H 85/0241 |
| 2006/0019541 A1* | 1/2006 | Maguire | H01H 85/542 |
| | | | 439/620.34 |
| 2010/0110594 A1* | 5/2010 | Walters | B60L 15/025 |
| | | | 903/930 |
| 2012/0244398 A1 | 9/2012 | Youngs et al. | |
| 2014/0117754 A1 | 5/2014 | Kreutzer et al. | |
| 2015/0042442 A1* | 2/2015 | Garascia | H01H 85/22 |
| | | | 337/201 |
| 2016/0304041 A1 | 10/2016 | Ennevi et al. | |
| 2018/0201153 A1 | 7/2018 | Sturza et al. | |
| 2019/0067886 A1* | 2/2019 | Jung | H01R 13/53 |
| 2020/0152946 A1 | 5/2020 | Burkman | |
| 2020/0231050 A1 | 7/2020 | Hirukawa et al. | |

* cited by examiner

*Primary Examiner* — Carlos Amaya
(74) *Attorney, Agent, or Firm* — David B. Kelley; Brooks Kushman P.C.

(57) ABSTRACT

A high-voltage module, such as a traction battery, a traction inverter, or a DC/DC converter of a traction powertrain of an electrified vehicle (EV), includes an enclosure and a fuse box. An electronics assembly for performing electrical power operations is housed within the enclosure. The enclosure has a socket. The fuse box is removably insertable into the socket of the enclosure. The fuse box connects to the electronics assembly while the fuse box is inserted into the socket of the enclosure for the fuse box to provide a power distribution and fuse protection arrangement to the electronics assembly.

14 Claims, 3 Drawing Sheets

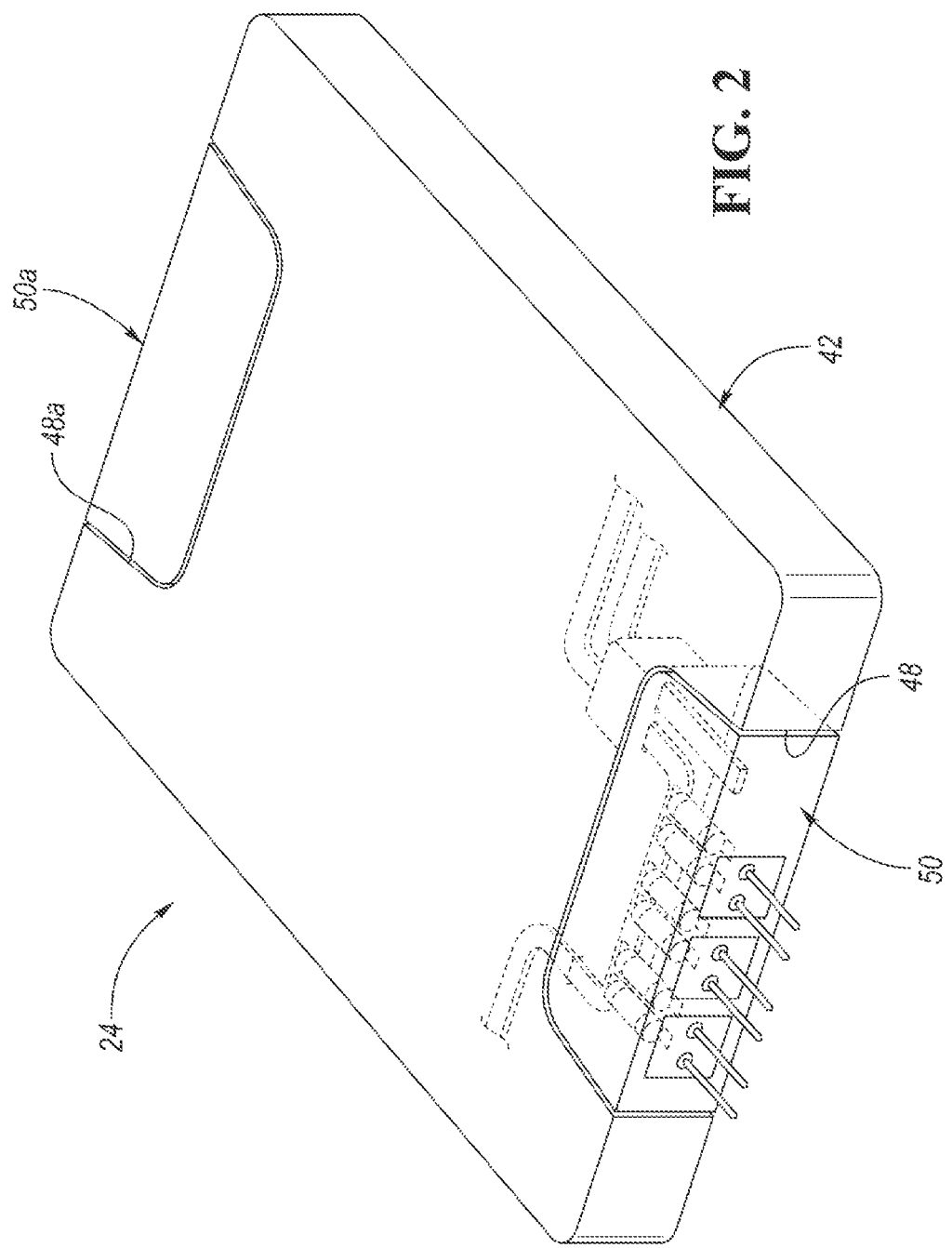

ELECTRIFIED VEHICLE TRACTION POWERTRAIN MODULE HAVING REMOVABLY INSERTABLE FUSE BOX

TECHNICAL FIELD

The present invention relates to a traction powertrain of an electrified vehicle.

BACKGROUND

An electrified vehicle includes a traction powertrain having high-voltage (HV) modules such as a traction battery and an inverter. The HV modules may be connected to one another and other modules/devices of the traction powertrain and of the electrified vehicle by junction boxes.

SUMMARY

A high-voltage (HV) module, such as for a traction powertrain of an electrified vehicle, is provided. The HV module includes an enclosure and a fuse box. The enclosure has a socket. The fuse box is removably insertable into the socket of the enclosure. The fuse box connects to an electronics assembly housed within the enclosure while the fuse box is inserted into the socket of the enclosure for the fuse box to provide a power distribution and fuse protection arrangement to the electronics assembly.

The fuse box disconnects from the electronics assembly while the fuse box is removed from the socket of the enclosure.

Electrical components of the fuse box such as fuses are accessible without having to access either the enclosure or the electronics assembly.

The enclosure with the fuse box inserted into the socket of the enclosure may have a rectangular form factor.

The fuse box inserted into the socket of the enclosure may be flush with a side of the enclosure having the socket of the enclosure.

The HV module may further include a second fuse box. In this case, the enclosure further has a second socket, and the second fuse box is removably insertable into the second socket of the enclosure. The second fuse box connects to the electronics assembly while the second fuse box is inserted into the second socket of the enclosure for the second fuse box to provide a second power distribution and fuse protection arrangement to the electronics assembly. The sockets of the enclosure may have a same form factor and the fuse boxes may have a same form factor whereby the fuse boxes are interchangeably removably insertable into the sockets of the enclosure.

The fuse box may include a receptacle, at least one fuse housed in the receptacle, and a cover plate for covering the receptacle, the cover plate being removable from the receptacle to allow access to the at least one fuse.

The fuse box may further include a first connector for connecting through a connector port of the receptacle with the electronics assembly housed within the enclosure to connect the fuse box to the electronics assembly while the fuse box is inserted into the socket of the enclosure. The fuse box may further include a second connector for connecting through a connector port of the cover plate with an external device to complete a connection between the electronics assembly and the external device via the fuse box while the fuse box is inserted into the socket of the enclosure.

Another HV module for an electrified vehicle is also provided. This HV module includes an enclosure, an electronics assembly for performing electrical power operations involving propulsion of the electrified vehicle, and a fuse box. The enclosure has a socket. The electronics assembly is housed within the enclosure. The fuse box is removably insertable into the socket of the enclosure. The fuse box connects to the electronics assembly while the fuse box is inserted into the socket of the enclosure for the fuse box to provide a power distribution and fuse protection arrangement to the electronics assembly.

An electrified vehicle is also provided. The electrified vehicle includes a traction powertrain having a first module. The first module includes an enclosure having a socket, an electronics assembly for performing electrical power operations involving propulsion of the electrified vehicle and being housed within the enclosure, and a fuse box removably insertable into the socket of the enclosure. The fuse box connects to the electronics assembly while the fuse box is inserted into the socket of the enclosure for the fuse box to provide a power distribution and fuse protection arrangement to the electronics assembly.

The electronics assembly is electrically connectable to a second module of the traction powertrain via the fuse box.

The traction powertrain may further have a second module including a second enclosure having a second socket, a second electronics assembly for performing electrical power operations involving propulsion of the electrified vehicle and being housed within the second enclosure, and a second fuse box removably insertable into the second socket of the second enclosure. The second fuse box connects to the second electronics assembly while the second fuse box is inserted into the second socket of the second enclosure for the second fuse box to provide a power distribution and fuse protection arrangement to the second electronics assembly. The second electronics assembly of the second module is electrically connected to the electronics assembly of the first module via the second fuse box of the second module and the fuse box of the first module.

The first module may be a traction battery of the traction powertrain, and the second module may be an inverter of the traction powertrain.

BRIEF DESCRIPTION OF THE DRAWINGS

FIG. 2 illustrates a conceptual schematic view of a high-voltage (HV) module of the EV in accordance with the present disclosure, the HV module including an enclosure, a HV electronics assembly for performing HV electrical power operations of the HV module, and a power distribution fuse box (PDFB) for providing power distribution and fuse protection services to the HV electronics assembly, the HV electronics assembly being arranged within the enclosure, and the enclosure including a socket with the PDFB being removably inserted in the socket of the enclosure;

DETAILED DESCRIPTION

Detailed embodiments of the present invention are disclosed herein; however, it is to be understood that the disclosed embodiments are merely exemplary of the present invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
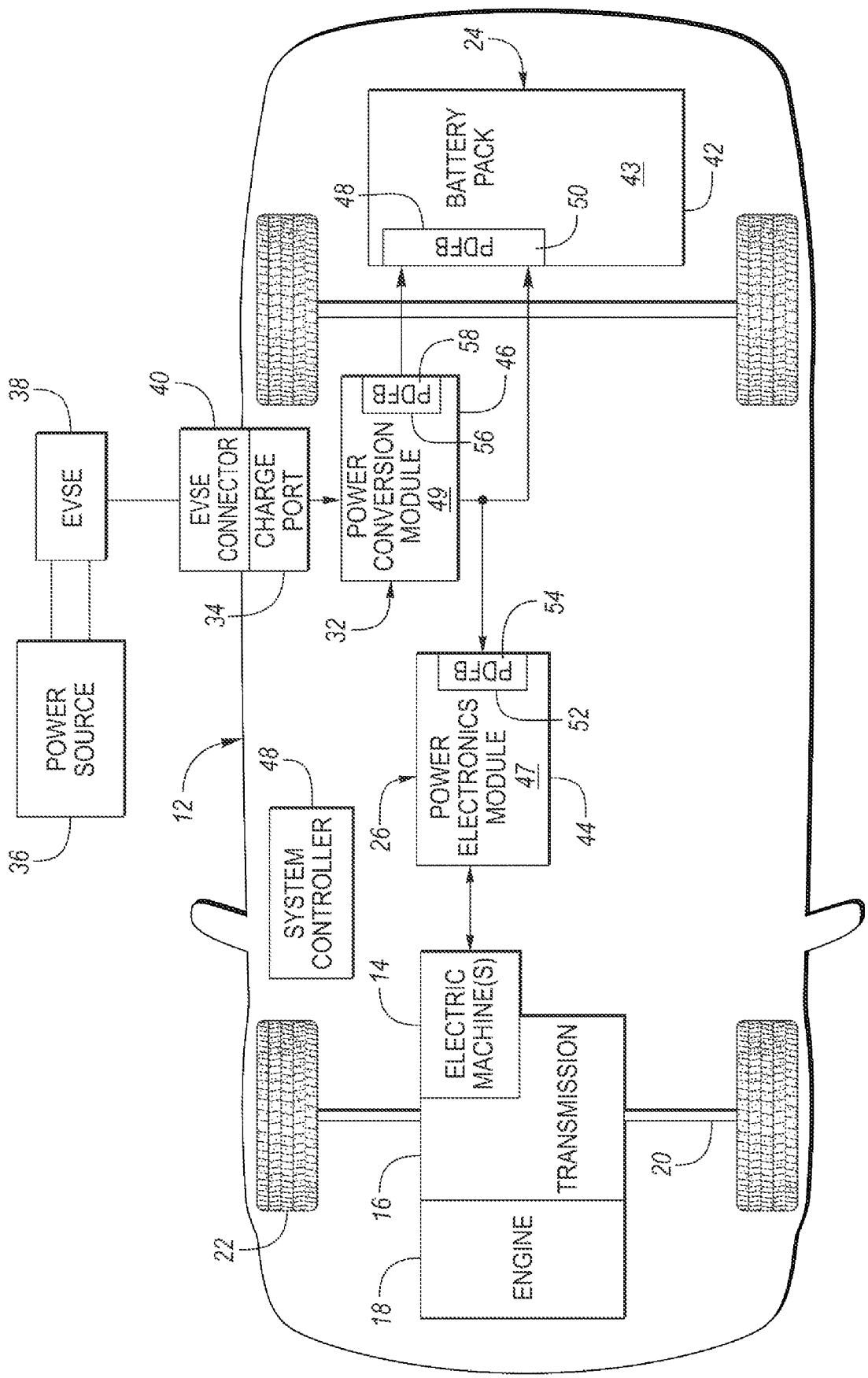
FIG. 1 illustrates a block diagram of an electrified vehicle (EV) in accordance with the present disclosure.

Referring now to FIG. 1, a block diagram of an electrified vehicle (EV) 12 in accordance with the present disclosure is shown. EV 12 includes a traction powertrain having one or more fraction motors ("electric machine(s)") 14, a traction battery ("battery pack") 24, and a power electronics module 26 (e.g., an inverter). In this example, EV 12 is a hybrid electric vehicle (HEV). In a HEV configuration, EV 12 further includes an engine 18. In other examples, EV 12 is a battery electric vehicle (BEV). In a BEV configuration, EV 12 does not include engine 18.

Traction motor 14 is part of the traction powertrain of EV 12 for powering movement of the EV (i.e., traction motor 14 is operable to provide propulsion capability to EV 12). In this regard, traction motor 14 is mechanically connected to a transmission 16 of EV 12. Transmission 16 is mechanically connected to a drive shaft 20 that is mechanically connected to wheels 22 of EV 12. Engine 18 is also mechanically connected to transmission 16 to provide propulsion capability to EV 12.

Traction motor 14 can provide propulsion capability to EV 12 while engine 18 is turned on or off. Traction motor 14 is capable of operating as a generator. Traction motor 14 acting as a generator can recover energy that may normally be lost as heat in a friction braking system of EV 12.

Traction battery 24 stores electrical energy that can be used by traction motor 14 for propelling EV 12. Traction battery 24 typically provides a high-voltage (HV) direct current (DC) output. Traction battery 24 is electrically connected to a power electronics module 26. Traction motor 14 is also electrically connected to power electronics module 26. Power electronics module 26, such as an inverter, provides the ability to bi-directionally transfer energy between traction battery 24 and traction motor 14. For example, traction battery 24 may provide a DC voltage while traction motor 14 may require a three-phase alternating current (AC) current to function. Inverter 26 may convert the DC voltage to a three-phase AC current to operate traction motor 14. In a regenerative mode, inverter 26 may convert three-phase AC current from traction motor 14 acting as a generator to DC voltage compatible with traction battery 24.

In this example, EV 12 is a plug-in HEV (PHEV). As such, traction battery 24 is rechargeable by an external power source 36 (e.g., the grid). External power source 36 may be electrically connected to electric vehicle supply equipment (EVSE) 38. EVSE 38 provides circuitry and controls to control and manage the transfer of electrical energy between external power source 36 and EV 12. External power source 36 may provide DC or AC electric power to EVSE 38. EVSE 38 may have a charge connector 40 for plugging into a charge port 34 of EV 12.

A power conversion module 32, such as an on-board charger having a DC/DC converter, of EV 12 may condition power supplied from EVSE 38 to provide the proper voltage and current levels to traction battery 24. Power conversion module 32 may interface with EVSE 38 to coordinate the delivery of power to traction battery 24.

The various components described above may have one or more associated controllers to control and monitor the operation of the components. The controllers can be microprocessor-based devices. The controllers may communicate via a serial bus (e.g., Controller Area Network (CAN)) or via discrete conductors.

For example, a system controller 48 ("vehicle controller") is present to coordinate the operation of the various components. Controller 48 includes electronics, software, or both, to perform the necessary control functions for operating EV 12. In embodiments, controller 48 is a combination vehicle system controller and powertrain control module (VSC/PCM). Although controller 48 is shown as a single device, controller 48 may include multiple controllers in the form of multiple hardware devices, or multiple software controllers with one or more hardware devices. In this regard, a reference to a "controller" herein may refer to one or more controllers.

Traction battery 24, inverter 26, and the DC/DC converter of power conversion module 32 ("DC/DC converter 32") handle high-voltage (HV) electrical power in their operations. For instance, traction battery 24 receives HV electrical power from DC/DC converter 32 for storage therein and the traction battery outputs HV electrical power to inverter 26 for use in propelling EV 12. Inverter 26 converts HV electrical power received from traction battery 24 into the requisite AC electrical power for traction motor 14. DC/DC converter 32 converts electrical power received via external power source 36 into HV electrical power for storage in traction battery 24.

Traction battery 24, inverter 26, and DC/DC converter 32 each include corresponding HV electronics assemblies operable for performing their associated HV electrical power operations. For instance, the HV electronics assembly 43 of traction battery 24 includes interconnected battery cells, a battery controller, etc.; the HV electronics assembly 47 of inverter 26 includes circuitry of transistors, diodes, inductors, etc.; and the HV electronics assembly 49 of DC/DC converter 32 includes circuitry of a DC link capacitor, power switches, and diodes, etc.

Traction battery 24, inverter 26, and DC/DC converter 32 are separate, individual hardware units. In accordance with the present disclosure, each hardware unit may include an enclosure (housing, casting, etc.) with the corresponding HV electronics assembly therein. In this case, for instance, HV electronics assembly 43 of traction battery 24 (i.e., the interconnected battery cells, the battery controller, etc.) is housed within the enclosure of the traction battery. Likewise, HV electronics assembly 47 of inverter 26 (i.e., the circuitry of transistors, diodes, inductors, etc.) is housed within the enclosure of the inverter; and HV electronics assembly 49 of DC/DC converter 32 (i.e., the circuitry of a DC link capacitor, power switches, and diodes, etc.) is housed within the enclosure of the DC/DC converter.

As set forth, traction battery 24, inverter 26, and DC/DC converter 32 are high-voltage (HV) modules which may include an enclosure with a corresponding HV electronics assembly therein. The enclosure may be a metallic enclosure such as an aluminum enclosure. For exemplary purposes, each HV module includes an enclosure with a corresponding HV electronics assembly therein. In this regard, as shown in FIG. 1, traction battery 24 includes an enclosure 42 with the traction battery HV electronics assembly 43 therein; inverter 26 includes an enclosure 44 with the inverter HV electronics assembly 47 therein; and DC/DC converter 32 includes an enclosure 46 with the DC/DC converter electronics assembly 49 therein.

The HV electronics assembly of a HV module, such as traction battery 24, inverter 26, and DC/DC converter 32, ordinarily utilizes a power distribution and fuse protection arrangement for the performance of its HV electrical power operations. The power distribution and fuse protection arrangement for the HV electronics assembly of a HV module is ordinarily provided by a junction box that is physically remote from the HV module and connected via wiring or the like to the HV electronics assembly of the HV module.

In accordance with the present disclosure, the enclosure of one or more of the HV modules includes a socket in which a power distribution fuse box (PDFB) (or "fuse box") is removably insertable therein. As such, a HV module further includes a PDFB, the enclosure of the HV module includes a socket, and the PDFB is removably insertable within the socket of the enclosure. The PDFB provides the power distribution and fuse protection arrangement for the HV electronics assembly arranged in the enclosure of the HV module.

Notably, although the PDFB and the HV electronics assembly of a HV module are to be connected for the HV electronics assembly to utilize the power distribution and fuse protection arrangement for the performance of its HV electrical power operations, the PDFB and the HV electronics assembly are otherwise physically isolated and remotely positioned from one another. The PDFB and the HV electronics assembly are physically isolated and remotely positioned from one another as the PDFB is arranged in the socket of the enclosure of the HV module whereas the HV electronics assembly is arranged in the enclosure of the HV module.

As the PDFB is in the socket of the enclosure and as the HV electronics assembly is in the enclosure, an operator can access the PDFB via the socket of the enclosure without having to access or disturb the HV electronics assembly in the enclosure. More particularly, an operator can remove the PDFB from the socket of the enclosure such as by pulling the PDFB out from the socket of the enclosure. The operator can then gain entry to the removed PDFB to access the contents (e.g., fuses) of the PDFB. As a result of the PDFB being removable from the socket of the enclosure, the integrity of the HV electronics assembly will be maintained should an operator access the PDFB such as for repair or updating of the PDFB.

As indicated, the PDFB is removably insertable (e.g., pluggable) into the socket of the enclosure of a HV module. As such, an operator can remove the PDFB from the socket of the enclosure and insert a new PDFB in the socket of the enclosure to replace the removed PDFB. Thus, as the PDFB by being arranged in (e.g., plugged into) the socket of the enclosure is physically isolated and remotely positioned from the HV electronics assembly arranged in the enclosure, the PDFB can be replaced without having to replace any of the HV electronics assembly. More generally, the PDFB of a HV module can be replaced without having to replace the entire HV module. In this way, other than the PDFB, the HV module does not have to be replaced or be considered as being potentially problematic or compromised due to handling of the PDFB.

As set forth, the enclosure of a HV module may further include a socket. A PDFB may be arranged in the socket of the enclosure for providing power distribution and fuse protection services to a HV electronics assembly arranged in the enclosure. For exemplary purposes, each HV module includes an enclosure with a corresponding HV electronics assembly therein and the enclosure includes a socket with a corresponding PDFB therein. In this regard, as shown in FIG. 1, enclosure 42 of traction battery 24 includes a socket 48 with a traction battery PDFB 50 therein; enclosure 44 of inverter 26 includes a socket 52 with an inverter PDFB 54 therein; and enclosure 46 of DC/DC converter 32 includes a socket 56 with a DC/DC converter PDFB 58 therein.

Referring now to FIG. 2, with continual reference to FIG. 1, a HV module in accordance with the present disclosure will be described in greater detail. FIG. 2 illustrates a conceptual schematic view of a HV module in the form of traction battery 24.

As shown, traction battery 24 has enclosure 42. Enclosure 42 includes socket 48. The traction battery electronics assembly 43 is arranged within enclosure 42. Traction battery PDFB 50 is removably insertable (e.g., pluggable) into socket 48 of enclosure 42. PDFB 50 and electronics assembly 43 (or perhaps a designated portion of electronics assembly 43) are connected while PDFB 50 is inserted (e.g., plugged) into socket 48 of enclosure 42. PDFB 50 provides a power distribution and fuse protection arrangement to electronics assembly 43 while PDFB 50 and electronics assembly 43 are connected. PDFB 50 and electronics assembly 43 are not connected while PDFB 50 is removed (e.g., unplugged) from socket 48 of enclosure 42.

In this example, enclosure 42 further includes a second socket 48a and a second traction battery PDFB 50a. Second PDFB 50a is removably insertable into second socket 48a of enclosure 42. Second PDFB 50a and electronics assembly 43 (or perhaps a different designated portion of electronics assembly 43) are connected while second PDFB 50a is inserted into second socket 48a of enclosure 42. Second PDFB 50a provides a power distribution and fuse protection arrangement to electronics assembly 43 while second PDFB 50a and electronics assembly 43 are connected. Second PDFB 50a and electronics assembly 43 are not connected while second PDFB 50a is removed from second socket 48a of enclosure 42.

In this example, socket 48 of enclosure 42 with PDFB 50 inserted therein and second socket 48a of enclosure 42 with second PDFB 50a inserted therein are located at respective front and rear sides of enclosure 42. Further in this example, socket 48 and second socket 48a of enclosure 42 have the same form factor and PDFB 50 and second PDFB 50a have the same form factor whereby PDFB 50 and second PDFB 50a are interchangeably removably insertable in socket 48 and second socket 48a of enclosure 42.

In this example, enclosure 42 with PDFB 50 and second PDFB 50a inserted in respective sockets 50 and 50a of enclosure 42 has a generally rectangular form factor. In this regard, PDFB 50 inserted in socket 48 of enclosure 42 is flush with the front side of enclosure 42 and is flush with top and bottom sides of enclosure 42. The flushness enhances sealing between PDFB 50 and socket 48 of enclosure 42. Likewise, second PDFB 50a inserted in second socket 48a of enclosure 42 is flush with the rear side of enclosure 42 and is flush with the top and bottom sides of enclosure 42.

Figure 3A:
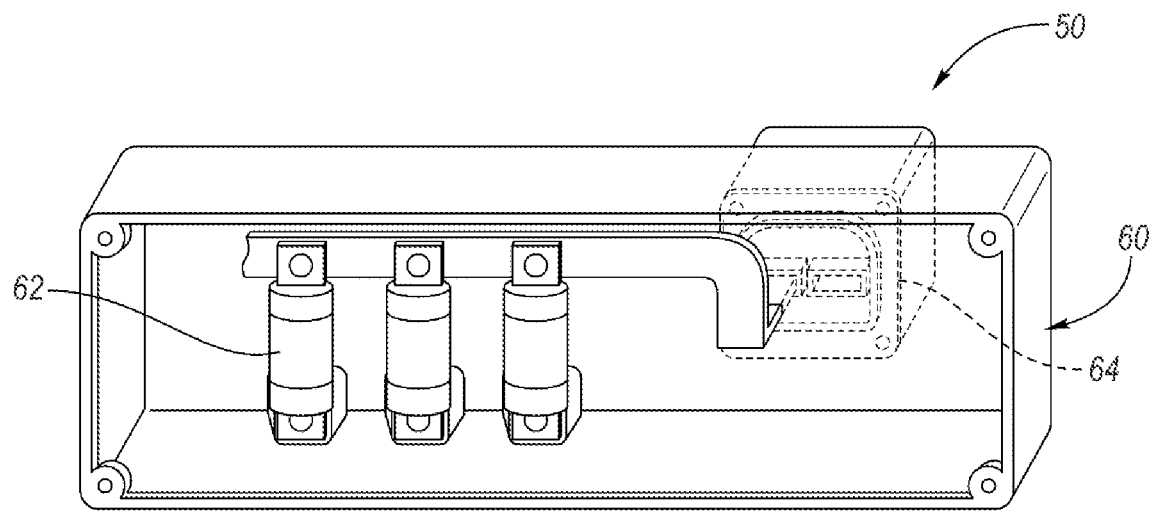
FIG. 3A illustrates a conceptual schematic view of a part of the PDFB in accordance with the present disclosure, this part of the PDFB including a receptacle with fuses of the PDFB arranged therein and with a connector for connecting the fuses in an electrical connection with the HV electronics assembly while the PDFB is inserted in the socket of the enclosure of the HV module, the conceptual schematic view of FIG. 3A looking into the interior of the receptacle of the PDFB.
Figure 3B:
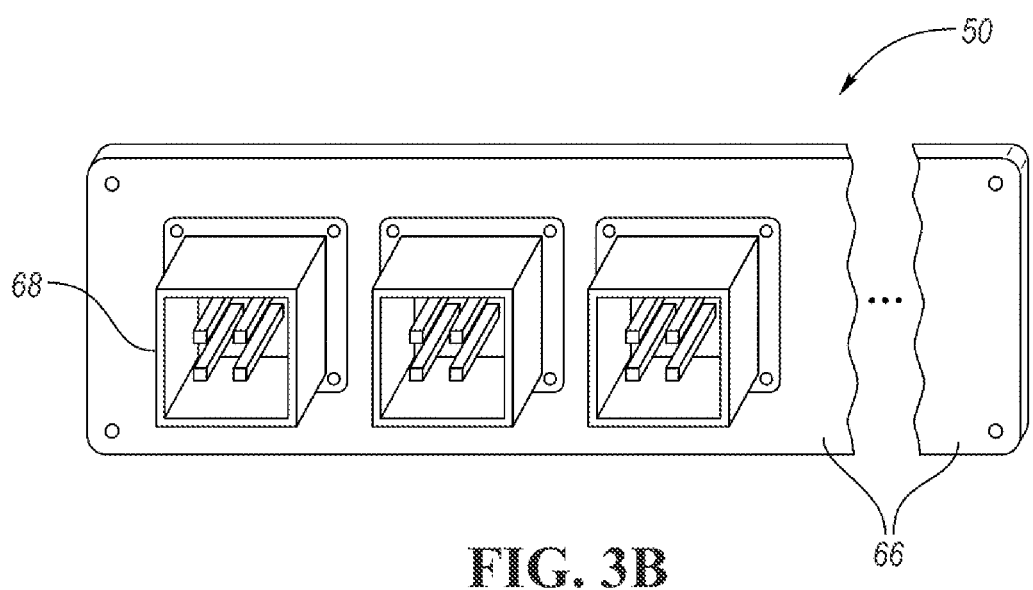
FIG. 3B illustrates a conceptual schematic view of a remaining part of the PDFB, this part of the PDFB including a cover plate for covering the receptacle of the PDFB, the cover plate including connectors for connecting the HV electronics assembly to other modules/devices of the EV in closed circuits in which respective ones of the fuses of the PDFB are employed while the PDFB is inserted in the socket of the enclosure of the HV module.

Turning now to FIGS. 3A and 3B, with continual reference to FIG. 2, the PDFB of a HV module in accordance with the present disclosure will be described in greater detail. FIGS. 3A and 3B illustrate respective conceptual schematic views of different parts of the PDFB in the form of traction battery PDFB 50.

As shown in FIG. 3A, PDFB 50 includes a receptacle 60. The conceptual schematic view of FIG. 3A is looking into the interior of receptacle 60. Receptacle 60 may be a metallic receptacle 60 such as an aluminum receptacle. PDFB 50 further includes one or more fuses 62 arranged within receptacle 60. In this example, PDFB 50 includes three fuses 62 having different amperage thresholds (e.g., 30 A, 40 A, and 50 A).

PDFB 50 further includes a connector 64. Connector 64 is for connecting fuses 62 in circuits with traction battery electronics assembly 43. Connector 64 is located on the rear side of receptacle 50 which faces socket 48 of enclosure 42 when PDFB 50 is inserted into socket 48. Connector 64 connects with a connection port (not shown) of enclosure 42 while PDFB 50 is inserted into socket 48 of enclosure 42. On one hand, while connector 64 is connected with the connection port of enclosure 42, connector 64 contacts corresponding busbars or the like of electronics assembly 43 for connector 64 to make positive and negative (e.g., ground) electrical connections to electronics assembly 43. On the other hand, a positive wiring of connector 64 is connected with one end of fuses 62 (e.g., the positive fuse end) and a negative wiring of connector 64 (e.g., the negative or ground busbar) is for completing circuits in which fuses 62 are employed. As such, while connector 64 makes the positive and negative electrical connections to electronics assembly 43, fuses 62 are in electrical connection with electronics assembly 43 for PDFB 50 to provide power distribution and fuse protection services to the electronics assembly.

Connector 64 being connected with the connection port of enclosure 42 seals the connection port. The connection port of enclosure 42 is the only portion of enclosure that is exposed to PDFB 50. Consequently, as the connection port of enclosure 42 is sealed off while connector 64 is connected to the connection port, electronics assembly 43 is sealed off from PDFB 50 when PDFB 50 is inserted into socket 48 of enclosure 42.

As shown in FIG. 3B, PDFB 50 further includes a cover plate 66. Cover plate 66 is removably attachable to receptacle 60 to cover the receptacle. Particularly, cover plate 66 covers the opened side of receptacle 60 which faces away from enclosure 42 when PDFB 50 is inserted into socket 48 of enclosure 42. Cover plate 66 is flush with the front side of enclosure 42 when PDFB 50 is inserted into socket 48 of enclosure.

An operator can remove cover plate 66 from receptacle 60 to gain access to the electrical components of PDFB 50 such as fuses 62. The removal of cover plate 66 from receptacle 60 may ordinarily be done while PDFB 50 is removed from socket 48 of enclosure 42. However, cover plate 66 may be removed from receptacle 60 while PDFB is inserted in socket 48 of enclosure 42.

Cover plate 66 includes one or more connectors 68 for electrical connecting electronics assembly 43 to other modules/devices of EV 12 via PDFB 50 while connector 64 of PDFB is connected to electronics assembly 43.

An electrical connection between electronics assembly 43 and another module/device of EV 12 via PDFB 50 involves a closed circuit in which a respective one of fuses 62 is employed. In this regard, the other end of fuses 62 (e.g., the negative or ground fuse end) are connected to respective wiring leading to each connector 68 and the negative wiring of connector 64 is connected to respective wiring leading from each connector 68. For example, one connector 68 is a four-way connector in which a first fuse 62 is part of a first circuit having a first positive wiring and a second negative wiring and in which a second fuse 62 is part of a second circuit having a third positive wiring and a fourth negative wiring.

As described, PDFB 50 is removably insertable (e.g., pluggable) into and out from socket 48 of enclosure 42. Thus, PDFB 50 can be removed from socket 48 of enclosure 42. Cover plate 66 can be removed from receptacle 60 so that the contents of the removed PDFB 50 can be accessed. Typically, a component of PDFB 50 such as a fuse 62 may need replacement and such fuse can be easily removed by the operator. That is, should a problem with PDFB 50 arise (for instance, a problem with a fuse 62), an operator can gain easy access to the PDFB without having to access or disturb the traction battery electronics assembly 43. As a result, electronics assembly 43 is left intact when PDFB 50 is accessed and/or a fuse 62 thereof is replaced.

As indicated, FIGS. 2, 3A, and 3B pertain to a HV module in the form of traction battery 24. The description thereof pertains to other HV modules such as in the form of inverter 26 and DC/DC converter 32.

As described, the present disclosure provides an integrated high-voltage (HV) junction fuse box module (i.e., the PDFB). The PDFB employs a sealed, modular HVJB (high-voltage junction box) design that attaches and connects directly to the electronics assembly of the HV module thereby reducing wires, connectors, brackets, and weight while improving serviceability and manufacturing. The HVJB design also reduces HV module complexity and offers interchangeable fuse configurations for upgradability and reusability on different types of electrified vehicles. The PDFB eliminates dedicated HV junction boxes and offers a unique isolated fusing serviceability to limiting access for the fuses for the HV module only without disturbing the electronics assembly of the HV module.

The PDFB can be designed to attach to the front and/or the rear of a HV module thereby connecting many different electrified vehicle options like ePTO (electric power take-off), OBC (on-board charging), ISC (inverter system control), PTC (positive temperature coefficient) heater, and others thereby minimizing wire lengths and manufacturing assembly. Overall, the PDFB design enables localized power distribution and fusing with enhanced overall electromagnetic compatibility.

While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. A high-voltage module comprising:
   an enclosure having a socket; and
   a fuse box removably insertable into the socket of the enclosure, the fuse box including a receptacle, at least one fuse housed in the receptacle, and a cover plate for covering the receptacle, the cover plate being removable from the receptacle to allow access to the at least one fuse, wherein the fuse box connects to an electronics assembly housed within the enclosure while the fuse box is inserted into the socket of the enclosure for the fuse box to provide a power distribution and fuse protection arrangement to the electronics assembly, the fuse box further includes a first connector for connecting through a connector port of the receptacle with the electronics assembly to connect the fuse box to the electronics assembly while the fuse box is inserted into the socket of the enclosure, and the fuse box further includes a second connector for connecting through a connector port of the cover plate with an external device to complete a connection between the electronics assembly and the external device via the fuse box while the fuse box is inserted into the socket of the enclosure.

2. The high-voltage module of claim 1 wherein:
the fuse box is disconnected from the electronics assembly while the fuse box is removed from the socket of the enclosure.

3. The high-voltage module of claim 1 wherein:
the fuse box includes electrical components; and
the electrical components of the fuse box are accessible without having to access either the enclosure or the electronics assembly.

4. The high-voltage module of claim 1 wherein:
the at least one fuse of the fuse box is replaceable without having to access either the enclosure or the electronics assembly.

5. The high-voltage module of claim 1 wherein:
the enclosure with the fuse box inserted into the socket of the enclosure has a rectangular form factor.

6. The high-voltage module of claim 1 wherein:
the fuse box inserted into the socket of the enclosure is flush with a side of the enclosure having the socket of the enclosure.

7. The high-voltage module of claim 1 further comprising:
a second fuse box;
wherein the enclosure further has a second socket; and
the second fuse box is removably insertable into the second socket of the enclosure, wherein the second fuse box connects to the electronics assembly while the second fuse box is inserted into the second socket of the enclosure for the second fuse box to provide a second power distribution and fuse protection arrangement to the electronics assembly.

8. The high-voltage module of claim 7 wherein:
the sockets of the enclosure have a same form factor and the fuse boxes have a same form factor whereby the fuse boxes are interchangeably removably insertable into the sockets of the enclosure.

9. The high-voltage module of claim 1 wherein:
the high-voltage module is a module of an electrified vehicle.

10. A high-voltage module for an electrified vehicle, comprising:
an enclosure having a first socket and a second socket;
an electronics assembly for performing electrical power operations involving propulsion of the electrified vehicle, the electronics assembly being housed within the enclosure;
a first fuse box removably insertable into the first socket of the enclosure, wherein the first fuse box connects to the electronics assembly while the first fuse box is inserted into the first socket of the enclosure for the first fuse box to provide a first power distribution and fuse protection arrangement to the electronics assembly; and
a second fuse box removably insertable into the second socket of the enclosure, wherein the second fuse box connects to the electronics assembly while the second fuse box is inserted into the second socket of the enclosure for the second fuse box to provide a second power distribution and fuse protection arrangement to the electronics assembly.

11. The high-voltage module of claim 10 wherein:
the first fuse box includes electrical components; and
the electrical components of the first fuse box are accessible without having to access either the enclosure or the electronics assembly.

12. An electrified vehicle comprising:
a traction powertrain having a first module and a second module;
wherein the first module includes a first enclosure having a first socket, a first electronics assembly for performing electrical power operations involving propulsion of the electrified vehicle and being housed within the first enclosure, and a first fuse box removably insertable into the first socket of the first enclosure;
the second module includes a second enclosure having a second socket, a second electronics assembly for performing electrical power operations involving propulsion of the electrified vehicle and being housed within the second enclosure, and a second fuse box removably insertable into the second socket of the second enclosure;
the first fuse box connects to the first electronics assembly while the first fuse box is inserted into the first socket of the first enclosure for the first fuse box to provide a power distribution and fuse protection arrangement to the first electronics assembly;
the second fuse box connects to the second electronics assembly while the second fuse box is inserted into the second socket of the second enclosure for the second fuse box to provide a power distribution and fuse protection arrangement to the second electronics assembly; and
the second electronics assembly is electrically connected to the first electronics assembly via the second fuse box and the first fuse box.

13. The electrified vehicle of claim 12 wherein:
the first fuse box includes electrical components; and
the electrical components of the first fuse box are accessible without having to access either the first enclosure or the first electronics assembly.

14. The electrified vehicle of claim 12 wherein:
the first module is a traction battery of the traction powertrain, and the second module is an inverter of the traction powertrain.

* * * * *